Dec. 20, 1927.  1,653,262
J. T. DICKSON
REVERSE GEAR
Filed Feb. 20, 1926    2 Sheets-Sheet 2
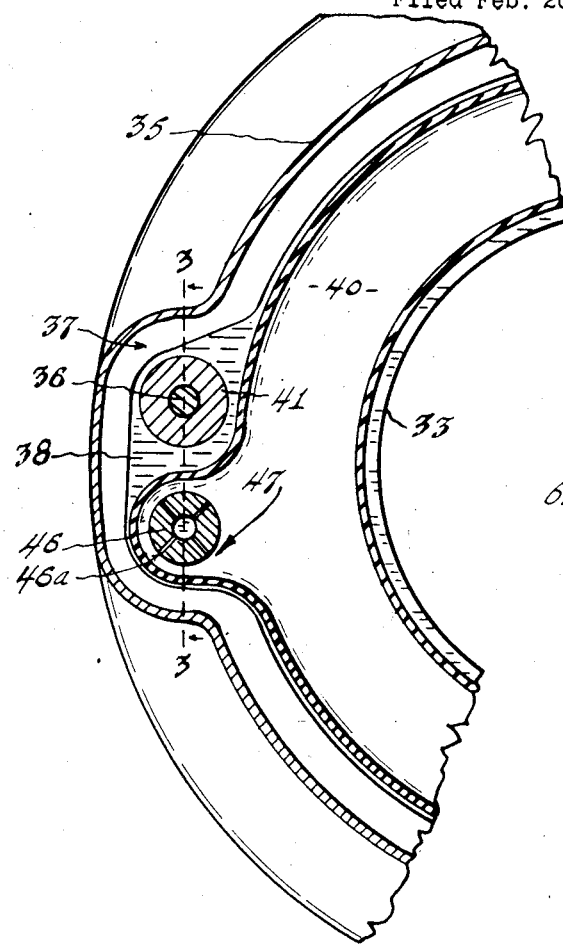
Fig. 2.
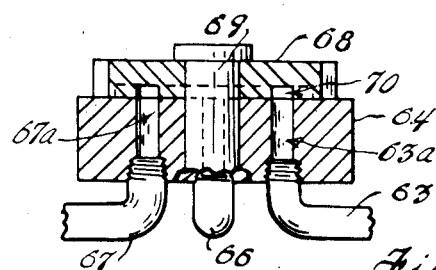
Fig. 5.
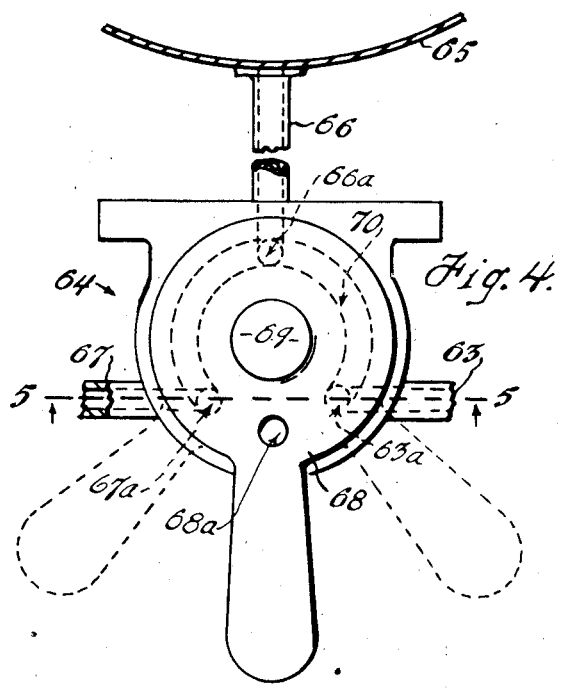
Fig. 4.
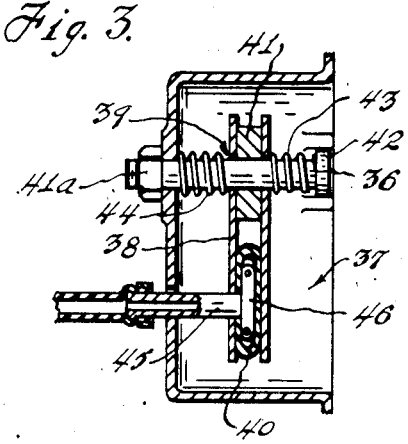
Fig. 3.
INVENTOR.
James T. Dickson.
BY
ATTORNEY.

Patented Dec. 20, 1927.

1,653,262

UNITED STATES PATENT OFFICE.

JAMES T. DICKSON, OF LOS ANGELES, CALIFORNIA.

REVERSE GEAR.

Application filed February 20, 1926. Serial No. 89,559.

The present invention relates to reverse gears, and pertains more particularly to reverse gears suitable for motor boats, although it will be apparent hereinafter that my invention is applicable to any condition where reverse gears are required.

The invention has for its principal object the provision of a simple reverse gear which may be operated easily from a distance.

Another object of the invention is to provide a reverse gear which may be operated without strength or effort, as by turning a valve or wheel.

Another object of the invention is to provide a reverse gear in which the change, from full speed ahead to full speed astern, may be accomplished very quickly but with a steady transition from one direction of rotation to the other without sudden strain on any of the parts.

Another object of the invention is to provide a reverse gear in which contacts are all frictional.

Still another object of the invention is to provide reverse gears in which all gears and pinions are constantly in mesh, and whereby change in direction is accomplished without sliding gears.

Still another object of the invention is to provide reverse gears which may be operated by pneumatic means so that the exhaust from the engine, or a small supply of compressed air, may be employed for operation thereof.

Other objects and advantages of my invention will appear hereinafter.

I have illustrated my invention by the accompanying drawings, in which:—

Figure 2 is a fragmentary view in vertical section of a part of the device taken along the center line of a part hereinafter known as the stator clutch.

Figure 3 is a view similar to Fig. 2, but taken along the center line of a part hereinafter known as the drum clutch.

Figure 4 is a plan view of a valve for controlling the mechanism.

Figure 5 is a view in vertical section thereof.

Figure 1:
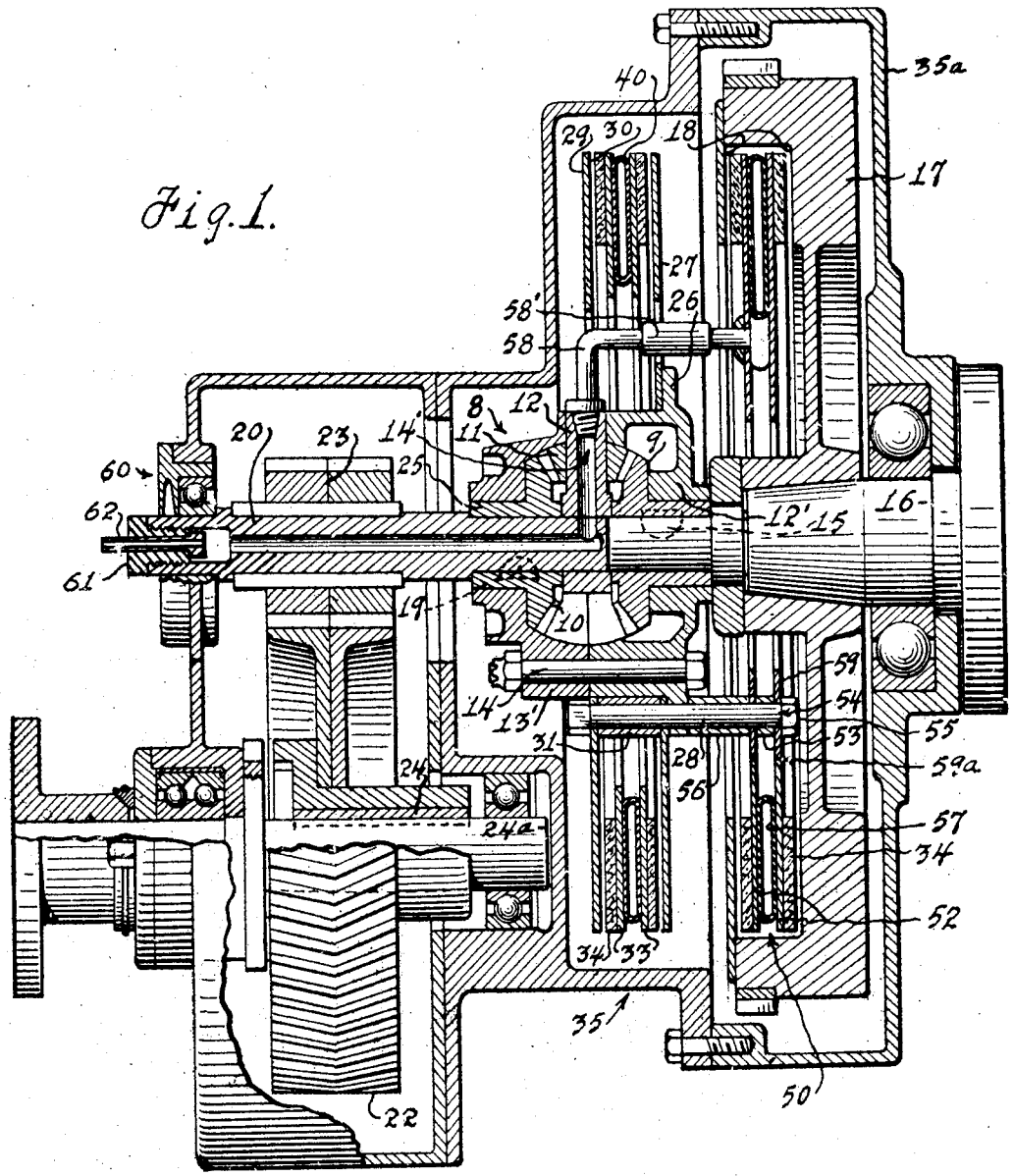
Figure 1 is a view in a vertical section of one principal embodiment of my invention.

In carrying out my invention in the preferred embodiment, I employ a planetary differential, generally indicated by the numeral 8, and including a driving gear 9, a driven gear 10 directly opposed to the driving gear, and a plurality of planetary pinions 11, meshing jointly with the driving gear and driven gear, respectively. The pinions are revolubly mounted on spindles 12, which are carried by a split spider which embodies two halves, 12' and 13', respectively, connected by bolts 14. This arrangement of gears is common to the rear axles of automotive vehicles and needs no further description herein. One different feature of this differential, however, is that the spindles 12 are each provided with a through bore 14', for conveying air or gas under pressure.

The driving gear is keyed, as at 15, to a crank shaft 16, of an engine or the like (not shown). To said shaft there is also fixed a fly-wheel or clutch drum 17, having opposed spaced friction surfaces 18. The driven gear is fixed, as at 19, to a driven tail shaft 20. The tail shaft is revoluble independently of the crank, or drive, shaft, and it is the purposes of the mechanism to cause the drive shaft to drive the driven shaft in the same direction, or the opposite direction, as desired. It is also another purpose to provide for allowing the crank shaft to run without movement on the part of the driven shaft. The driven shaft, or tail shaft, may be connected to any machine, axle, shaft or propeller (not shown), and in the present embodiment it carries a split herringbone gear 22, meshing with a larger gear 23. The latter gear is keyed, as at 24, to a propeller shaft 24ª, and the embodiment shown in the drawings is particularly suited for driving a low speed boat propeller with a high speed engine.

Both the driving and driven gears, respectively, are provided with collars 25, which serve as bearings for the corresponding halves of the revoluble spider. The spider is provided with a flange 26, to which is affixed a friction disc 27, as by bolts 28. The same bolts 28 also serve to affix another disc 29 to the spider. These two discs are spaced apart and present inner opposed friction surfaces 30.

Bushings 31 serve to hold the discs spaced apart. These discs revolve with the revoluble spider, and means are provided for holding the discs against rotation, so that the spider may be retarded or held stationary. Said means are provided in the form of a pair of spaced laterally movable friction plates 33, having cork, or similar facings 34. The friction plates are fixed with regard to a casing 35, which encloses all parts being described, and which is hereinafter referred to as the stator, to distinguish it, and its attached friction plates, from other parts which are revoluble. The stator is provided with a plurality of pins 36, disposed in extended cavities 37. The friction plates are provided with extended ears 38, which extend into said cavities. Said ears are provided with apertures 39, and the pins extend through the apertures of corresponding ears so that the friction plates are laterally movable in a path paralleling the axis of the drive shaft, while being non-revoluble. Between the spaced plates there is provided an annular flexible bag or inflater 40. A bushing 41, between the plates, holds them spaced apart the minimum distance. The pins extend through the casing at one end to receive a nut 41$^a$, which holds the corresponding pin in fixed position. The inner end of each pin is provided with a head 42. A spring 43, between the head and one plate, and another spring 44, between the casing wall and the other disc, serve to hold the plates in juxtaposition. A tube 45 is extended through the casing and the inflater, and terminates in a large perforate head 46 within the interior space 47 of the inflater. A nut 48 externally threaded on the tube, abuts the casing exteriorly and holds the tube and inflater in place. Obviously, air under pressure admitted through the tube will fill and dilate the inflater, and will cause the friction plates to move laterally away from each other, thus bringing the facings of the friction plates into frictional contact with the friction surfaces of the revoluble discs. It will be apparent now that by inflating the said inflater, the cork faces will frictionally engage the stationary discs, and as a consequence the spider and its pinions will be held stationary. The pinions, when held stationary, cause the drive shaft to revolve the driven shaft in the direction opposed to the direction of rotation of the said drive shaft. In other words, the inflater, the discs and the friction plates coact as a complete pneumatic clutch to cause the tail shaft to be driven in reverse. Of course, any suitable clutch of other designs may be employed for this purpose. When the discs and plates are out of frictional engagement, the pinions and the spider are free to idle, and under such condition the drive shaft is ineffective upon the driven shaft; the pinions being free to rotate and roll around between the two gears at one half speed, as will be immediately apparent to those skilled in the art of planetary differentials.

In order to cause the driving gear to drive the driven gear in the same direction at full speed ahead, I provide a second clutch generally indicated by the numeral 50, and serving as a means for connecting the revoluble spider with the driving gear through the fly-wheel. Said clutch includes two spaced friction plates 52, which are mounted on the pins which hold the friction discs of the first described clutch. The plates 52 are accordingly revoluble with the spider and are never independent thereof. Said plates likewise are provided with cork facings, and are spaced apart slightly by a bushing 53; one for each of the pins. The plates are provided with apertures 54, through which the pins pass; nuts 55 serving to hold the plates in position. A third set of bushings 56; one for each pin, act to hold the first described clutch spaced from the plates 52. Between the plates there is provided a second inflater 57, so that the plates may be driven apart to cause the cork facing to frictionally engage corresponding friction surfaces of the fly-wheel or drum. A tube 58, similar to the tube previously described, serves to hold the inflater and to convey air to the interior thereof. Said tube connects with the bore of the pinion spindle so that the air may be conveyed through the tail shaft to the inflater 57 while same is revolving. Portions 59, of the plates, are partially separated from the body of the plates, as at 59$^a$, to provide spring fingers, such as described in the copending application of Horace F. Scruby, for fluid brakes and the like, Serial No. 12,791, filed March 2, 1925. These fingers permit of the plates being moved apart. It will be apparent now, that when the inflater 57 is inflated, the spider and its attached pinions will be compelled to revolve coordinately with the driving gear, and as a consequence the pinions merely act as keys between the driving gear and the driven gear, respectively, causing the drive shaft to drive the driven shaft at full speed in the same direction.

The casing is provided with an end bearing 60, through which the tail shaft extends. A centrally bored nut 61 is threaded into the tail shaft and serves to retain a nipple 62 which is revoluble therein. To the nipple there is attached a hose or tube 63, leading to a two-way plug cock 64. One position of the plug will direct air from a tank 65, to one inflater, while another position of the plug will direct air from the tank to the inflater 57. Thus either clutch may be thrown into engagement at will, but both clutches cannot be thrown in at the same time, ordinarily. If both clutches were thrown in at the same time, the effect would merely be that one or both of the clutches would act as a brake and bring both of the shafts to rest. By suitable arrangement of the tubes and valves, many different combinations of braking actions and driving actions, respectively, may be obtained.

The operation of the device is practically apparent from the foregoing, but the following will explain the general use and function of the device as a whole:—When neither inflater is inflated, the drive shaft may be rotated without affecting the driven shaft, as explained. By admitting air to the inflater, which is within the fly-wheel, the planetary gears will revolve with the drive shaft around the axis of said drive shaft, but they cannot rotate on their spindles, inasmuch as they are moving coordinately with the drive gear.

Since said pinions are in mesh with the driven gear, but cannot rotate on their axes, they will act as keys between the driving gear and the driven gear. As a consequence the driving shaft, as it rotates, will drive the driven shaft in the same direction. When it is desired to reverse rotation of the driven shaft, the valve is turned so that the air is admitted to the other inflater, only. When the stationary plates 30 are caused to frictionally engage the disc 27, the spider will be held against rotation. The pinions will then remain stationary by reason of their spindles being stationary, but they will be revolved on their spindles by the action of the driving gear. Such rotation of the pinions will cause the driven gear and tail shaft to be rotated in a direction opposed to the direction of rotation of the crank shaft and driving gear. Simultaneous inflation of the inflaters will cause both the drive shaft and the driven shaft to be brought to rest.

I claim:—

1. In a mechanism of the class described, a stationary casing, a drive shaft extended into said casing, a drum fixed to said shaft, a driving gear fixed to said drive shaft in said casing, a pair of oppositely movable friction plates non-revolubly fixed to said casing, an inflater between said friction plates, a spider revoluble around the axis of said shaft and gear, a driven shaft coaxial of the driving shaft and opposed thereto, a driven gear on said drive shaft coaxial of, and opposed to, said driving gear, pinion revolubly mounted to said spider and meshing jointly with said driving gear and driven gear, respectively, discs fixed to revolve with said spider and disposed one to either side of said friction plates; said drum presenting opposed friction surfaces, a pair of spaced laterally movable friction plates disposed within said drum between the friction surfaces thereof, an inflater between said last named plates; said last named plates carried by said discs to revolve therewith.

2. The mechanism as in claim 1 and including, means for selectively directing fluid pressure into the said inflaters.

3. The mechanism as in claim 1 and including, means for selectively directing fluid pressure into the said inflaters; said means capable of directing pressure to only one inflater at a time.

4. The mechanism as in claim 1 and further including, a hollow spindle for one of the planetary pinions, and a tube connecting said spindle with the last named inflater; said spindle having one end connected with said tube and the other end constantly in surface contact with said driven shaft; said driven shaft provided with a bore leading from its outermost end to said hollow spindle, and the outermost end of said driven shaft being in communication with a source of fluid pressure.

JAMES T. DICKSON.